(12) United States Patent
Patel et al.

(10) Patent No.: US 7,630,633 B2
(45) Date of Patent: Dec. 8, 2009

(54) OPTICAL BIT STREAM READER SYSTEM AND METHOD

(76) Inventors: C. Kumar N. Patel, 1171 Roberto La., Los Angeles, CA (US) 90077; Lakshminarayanan Ravi Narasimhan, 715 Gaylay Ave., #217, Los Angeles, CA (US) 90026

( * ) Notice: Subject to any disclaimer, the term of this patent is extended or adjusted under 35 U.S.C. 154(b) by 0 days.

(21) Appl. No.: 11/810,378

(22) Filed: Jun. 5, 2007

(65) Prior Publication Data
US 2007/0242952 A1    Oct. 18, 2007

Related U.S. Application Data

(63) Continuation of application No. 10/277,949, filed on Oct. 22, 2002, now Pat. No. 7,233,739.

(60) Provisional application No. 60/344,445, filed on Oct. 22, 2001.

(51) Int. Cl.
*H04B 10/00* (2006.01)

(52) U.S. Cl. .............................. 398/28; 398/25; 398/13; 398/141

(58) Field of Classification Search .................. 398/25, 398/13, 28, 151, 16, 20, 9, 32, 33, 141, 142, 398/143, 144, 31, 15, 21; 385/15, 27, 28, 385/32, 100, 123, 124, 126, 115, 129; 356/73.1
See application file for complete search history.

(56) References Cited

U.S. PATENT DOCUMENTS

| | | | |
|---|---|---|---|
| 3,909,749 A * | 9/1975 | Weber | 359/244 |
| 4,128,299 A | 12/1978 | Maher | 385/4 |
| 4,322,126 A | 3/1982 | Minowa et al. | 385/18 |
| 4,472,053 A | 9/1984 | Wyatt et al. | 356/121 |
| 4,618,211 A * | 10/1986 | Fleury | 385/48 |
| 4,685,766 A | 8/1987 | Nishimura et al. | 385/125 |
| 4,705,349 A | 11/1987 | Reedy | 385/22 |
| 4,740,951 A * | 4/1988 | Lizet et al. | 398/87 |
| H474 H | 6/1988 | Taylor | 385/27 |
| 4,753,505 A | 6/1988 | Mikami et al. | 385/5 |
| 4,776,658 A | 10/1988 | Normandin | 385/28 |
| 4,820,016 A * | 4/1989 | Cohen et al. | 385/5 |
| 4,970,713 A | 11/1990 | Imoto | 385/24 |
| 4,973,169 A | 11/1990 | Slonecker | 398/79 |

(Continued)

*Primary Examiner*—M. R. Sedighian
(74) *Attorney, Agent, or Firm*—Cislo & Thomas, LLP

(57) ABSTRACT

An all optical fiber bit stream reader system for examining the data contents of an optical fiber involving the conversion of a temporal timing signal into a spatially located signal is provided. The invention generally comprises generating and detecting a signal indicating the presence of data, in a manner which is minimally destructive to the data. One embodiment comprises providing a piece of optical fiber that exhibits a nonlinear response through a two photon absorption process and subsequent emission of a photon corresponding to the two photon absorption process. Such a fiber could comprise a conventional doped silica fiber into which an additional dopant has been introduced. Another embodiment involves modifying the index of refraction of the cladding of the optical fiber line. This causes a fraction of the electric field or light pulse guided through the fiber (if present) to be coupled out of the fiber. Thereafter, the pulse can be detected. The optical bit steam reader can be used for important problems in optical communications such as switching, test-and-measurement, system housekeeping, data sampling, and fiber tapping for optical communications.

14 Claims, 6 Drawing Sheets

U.S. PATENT DOCUMENTS

| | | | | |
|---|---|---|---|---|
| 5,060,307 A | 10/1991 | El-Sherif | ................... | 398/200 |
| 5,078,478 A | 1/1992 | Evans, Jr. et al. | ........... | 359/299 |
| 5,091,653 A | 2/1992 | Creager et al. | .............. | 250/484 |
| 5,133,027 A | 7/1992 | Funazaki et al. | ................ | 385/5 |
| 5,136,669 A | 8/1992 | Gerdt | ........................ | 385/39 |
| 5,244,846 A | 9/1993 | Onishi et al. | ................... | 501/40 |
| 5,249,251 A | 9/1993 | Egalon et al. | ................. | 385/123 |
| 5,253,322 A | 10/1993 | Onishi et al. | ................. | 385/142 |
| 5,259,061 A | 11/1993 | Burns et al. | .................. | 385/132 |
| 5,299,210 A | 3/1994 | Snitzer et al. | .................. | 372/6 |
| 5,445,767 A | 8/1995 | Winter et al. | ................ | 252/587 |
| 5,485,296 A | 1/1996 | Healey et al. | ................. | 398/40 |
| 5,546,480 A | 8/1996 | Leonard | ....................... | 385/3 |
| 5,550,654 A | 8/1996 | Erdogan et al. | ................ | 359/3 |
| 5,566,015 A * | 10/1996 | Puzey | ......................... | 398/140 |
| 5,568,574 A | 10/1996 | Tanguay, Jr. et al. | .......... | 385/14 |
| 5,627,933 A | 5/1997 | Ito et al. | ...................... | 385/123 |
| 5,647,039 A | 7/1997 | Judkins et al. | ................ | 385/37 |
| 5,647,040 A | 7/1997 | Modavis et al. | ............... | 385/42 |
| 5,732,177 A | 3/1998 | Deacon et al. | ................ | 385/122 |
| 5,796,884 A | 8/1998 | Wingo | ......................... | 385/16 |
| 5,825,525 A | 10/1998 | Harwit | ........................ | 359/248 |
| 5,828,452 A | 10/1998 | Gillispie et al. | ............. | 356/328 |
| 5,889,906 A | 3/1999 | Chen | .......................... | 385/28 |
| 5,903,685 A | 5/1999 | Jones et al. | ................... | 385/12 |
| 5,903,690 A | 5/1999 | Starodubov et al. | ........... | 385/37 |
| 5,912,257 A | 6/1999 | Prasad et al. | ................. | 514/356 |
| 5,933,271 A | 8/1999 | Waarts et al. | ................. | 359/341 |
| 5,943,160 A | 8/1999 | Downing | ....................... | 359/326 |
| 5,949,941 A | 9/1999 | DiGiovanni | ................ | 385/127 |
| 5,959,753 A | 9/1999 | Duling, III et al. | ............ | 398/155 |
| 5,966,491 A | 10/1999 | DiGiovanni | ................ | 385/127 |
| 5,978,524 A | 11/1999 | Bischel et al. | ................. | 385/4 |
| 5,999,669 A | 12/1999 | Pan et al. | ...................... | 385/18 |
| 6,009,219 A | 12/1999 | Doyle | ......................... | 385/23 |
| 6,011,637 A | 1/2000 | Pfeiffer | ......................... | 398/1 |
| 6,031,946 A | 2/2000 | Bergmann et al. | ............ | 385/18 |
| 6,043,930 A | 3/2000 | Inagaki | ....................... | 359/341 |
| 6,058,231 A | 5/2000 | Haggans et al. | ............... | 385/37 |
| 6,081,632 A | 6/2000 | Yoshimura et al. | ............. | 385/5 |
| 6,097,874 A | 8/2000 | Yunoki | ....................... | 385/140 |
| 6,101,013 A | 8/2000 | Monacos | ....................... | 398/1 |
| 6,118,530 A | 9/2000 | Bouevitch et al. | ............ | 356/308 |
| 6,118,575 A | 9/2000 | Grubb et al. | ................. | 359/337 |
| 6,141,475 A | 10/2000 | Lawrence et al. | ........... | 385/123 |
| 6,151,438 A | 11/2000 | Espindola et al. | ........... | 385/140 |
| 6,160,656 A | 12/2000 | Mossberg et al. | ........... | 359/328 |
| 6,172,926 B1 | 1/2001 | Drayer | ....................... | 365/215 |
| 6,175,437 B1 | 1/2001 | Diels et al. | ................... | 398/201 |
| 6,201,909 B1 | 3/2001 | Kewitsch et al. | .............. | 385/37 |
| 6,205,263 B1 | 3/2001 | Lieberman et al. | ......... | 385/12 |
| 6,205,274 B1 | 3/2001 | Zhou | .......................... | 385/38 |
| 6,208,776 B1 | 3/2001 | Prohaska et al. | .............. | 385/13 |
| 6,221,566 B1 | 4/2001 | Kohnke et al. | .............. | 430/321 |
| 6,222,973 B1 | 4/2001 | Starodubov | ................. | 385/128 |
| 6,233,373 B1 | 5/2001 | Askins et al. | .................. | 385/12 |
| 6,252,557 B1 | 6/2001 | Plugge et al. | ................. | 343/772 |
| 6,263,095 B1 | 7/2001 | Rushbrooke et al. | ......... | 382/128 |
| 6,282,005 B1 * | 8/2001 | Thompson et al. | .......... | 398/143 |
| 6,421,154 B1 | 7/2002 | Diels et al. | ................... | 398/182 |
| 6,444,999 B1 | 9/2002 | Tomita | ........................ | 257/14 |
| 6,483,735 B1 | 11/2002 | Rentzepis | .................... | 365/119 |
| 6,552,844 B2 | 4/2003 | Lim | ............................ | 359/337 |
| 6,614,213 B1 | 9/2003 | Whitbread et al. | ............ | 324/72 |
| 6,731,883 B1 | 5/2004 | Barry et al. | ................. | 398/207 |
| 6,819,428 B2 | 11/2004 | Ogawa | ....................... | 356/450 |
| 7,130,537 B1 * | 10/2006 | Maxham | ....................... | 398/17 |
| 7,233,739 B2 * | 6/2007 | Patel et al. | ..................... | 398/25 |
| 2001/0019643 A1 | 9/2001 | Yamauchi et al. | .............. | 385/37 |
| 2003/0011776 A1 | 1/2003 | Ogawa | ........................ | 356/450 |
| 2003/0099264 A1 | 5/2003 | Dantus et al. | ................. | 372/25 |
| 2003/0202547 A1 | 10/2003 | Fermann et al. | ................ | 372/6 |
| 2003/0202795 A1 | 10/2003 | Garcia et al. | ................. | 398/147 |
| 2004/0052522 A1 | 3/2004 | Fishteyn et al. | ................ | 398/29 |
| 2004/0151495 A1 | 8/2004 | Knox et al. | ................... | 398/25 |
| 2004/0175174 A1 | 9/2004 | Suhami | ....................... | 398/43 |
| 2004/0208615 A1 | 10/2004 | Kean | ........................ | 398/155 |
| 2004/0223385 A1 | 11/2004 | Fleming et al. | ............. | 365/202 |
| 2005/0008044 A1 | 1/2005 | Fermann et al. | ............... | 372/19 |
| 2005/0058449 A1 | 3/2005 | Ogawa | ........................ | 398/9 |
| 2005/0117191 A1 | 6/2005 | Griffin | ........................ | 359/245 |

* cited by examiner

OPTICAL BIT STREAM READER SYSTEM AND METHOD

CROSS-REFERENCES TO RELATED APPLICATIONS

Applicant(s) and/or Inventor(s) hereby rescind any disclaimer and/or any arguments made in any prior related application. Such disclaimer(s) and/or argument(s) as well as any prior art relevant to such disclaimer(s) and/or argument(s) may need to be revisited by the Examiner.

This patent application is a continuation of U.S. patent application Ser. No. 10/277,949 filed Oct. 22, 2002 now U.S. Pat. No. 7,233,739 entitled Optical Bit Stream reader System which claims priority from U.S. Provisional Patent Application Serial No. 60/344,445, filed Oct. 22, 2001, for OPTICAL BIT STREAM READER, which applications are incorporated herein by this reference thereto.

COPYRIGHT AUTHORIZATION

Portions of the disclosure of this patent document may contain material which is subject to copyright and/or mask word protection. The copyright and/or mask word owner has no objection to the facsimile reproduction by anyone of the patent document or the patent disclosure, as it appears in the Patent and Trademark Office patent file or records, but otherwise reserves all copyright and/or mask rights whatsoever.

BACKGROUND OF THE INVENTION

1. Field of the Invention

This invention relates to a method of reading the data contents of an optical fiber line.

2. Description of the Related Art

Digital circuits used in the computing, networking, and communications industries have steadily moved towards higher speed, channel capacity, and reliability. The costs of piece parts, functional assemblies, system blocks, networks, and the services sold to end-users are simultaneously plummeting. Customers demand transparent access to faster networks with commensurate improvement in service offerings and uptime.

The standard practice in wide-bandwidth communication networks is to convert electrical impulses into light pulses and to propagate these pulses through optical fibers to their destinations where they are converted back into electrical signals. This eliminates a number of fundamental bottlenecks inherent to directly sending an equivalent amount of information in the same amount of time by purely electrical means. Technological developments in optical fiber materials, laser sources, detectors, and networks have proceeded at a pace faster than that of semiconductor electronics.

Optical diagnostic and switching methods, however, have not kept pace and are the primary roadblocks to growth in this sector. Electrical signals propagate as pulses along circuit traces and wires. They generate electrical fields which can be probed often without significant degradation of the pulse energy. However, most often the readout is destructive with a consequent storage of the pulse bit stream into a shift register and consequent regeneration of the bit stream in the original format. Optical pulses, on the other hand, are confined to propagating along the guiding structure of an optical fiber, and the energies in each pulse are small. Conventional ways of examining an optical data stream and making a decision based upon that result require destructively converting the optical pulses into electrical signals, using electrical methods to make the decision, regenerating the optical pulse train, and coupling it back into a specified optical fiber.

This is a complex, costly process with considerable scope for introducing, amplifying, and propagating errors. In addition to switching, examining an optical data stream for "signature analysis," fault testing, housekeeping, and/or sampling, as is routinely done in the test-and-measurement of electronic digital circuitry, has not been accomplished by optical techniques. All of these functions are typically done by storing the data stream in electronic shift registers. Additionally, conventional methods for "tapping" an optical line require disclosing the existence of a tap.

SUMMARY OF THE INVENTION

This invention provides an all optical fiber bit stream reader system for examining the data contents of an optical fiber involving the conversion of a temporal timing signal into a spatially located signal. The invention generally comprises generating and detecting a signal indicating the presence of data, in a manner which is minimally destructive to the data.

An all optical fiber bit stream reader system examines the data contents of an optical fiber and involves the conversion of a temporal timing signal into a spatially located signal. A signal is generated and detected that indicates the presence of data in a manner which is minimally destructive to the data.

One embodiment comprises providing a piece of optical fiber that exhibits a nonlinear response through a two photon absorption process and subsequent emission of a photon corresponding to the two photon absorption process. Such a fiber could comprise a conventional doped silica fiber into which additional dopants have been introduced.

In another embodiment, light pulses directed orthogonal to the fiber cause the energy level of the dopant to rise to a first excited state. If data pulse photons are simultaneously present, temporally as well as spatially, the dopant ion is further excited to a second excited state. From the second state the dopant ion decays to ground state emitting photons at one or more wavelengths in the process. Thereafter, the emitted wavelength(s) can be detected and, hence, the light pulses traveling at near velocity of light in the fiber have been spatially "frozen" by the temporal probing pulse.

Another embodiment involves modifying the index of refraction of the cladding of the optical fiber line. This causes a fraction of the electric field or light pulse guided through the fiber (if present) to be coupled out of the fiber. Thereafter, the pulse can be detected.

The index of refraction of the cladding can be modified by sending interrogating pulse streams through the cladding. The interrogating pulse streams may comprise two counter-propagating pulses which may set up an interference pattern so that the cladding is modified at specific locations.

According to this method, a dopant is not added to the core, but the cladding is coated on its surface or otherwise modified with a material that absorbs light at a specific wavelength so that its index of refraction can be modified with optical pulses at the frequency or wavelength of absorption.

The optical bit steam reader can be used for important problems in optical communications such as switching, test-and-measurement, system housekeeping, data sampling, and fiber tapping for optical communications.

The bit stream reader system of the present invention can be implemented as an all optical router and switcher which can read an optical header on a data packet, identify an intended destination of the data packet, switch the optical data packet to the identified destination in optical domain, provide a mechanism for identifying an empty time slot in optical domain, and restuff an empty optical data slot with an appropriate packet of information coming for a user. Other applications of the bit stream reader system include providing an all optical fiber data probe, an all optical probe for monitoring the health of an optical fiber system, and an all optical real-time, random-length optical fiber data sampler. Various other applications will be apparent to one skilled in the art.

Other embodiments of the present invention are set forth in more detail, below.

BRIEF DESCRIPTION OF THE DRAWINGS

FIG. 2A is one possible energy level scheme for generating an output photon, based on second state to ground emission.

FIG. 2B is another possible energy level scheme for generating an output photon, based on third state to ground emission.

FIG. 2C is another possible energy level scheme for generating an output photon, based on third to fourth state emission.

FIG. 2D is another possible energy level scheme for generating an output photon, based on second to fourth state emission, and second to third state absorption.

DESCRIPTION OF THE PREFERRED EMBODIMENT(S)

Figure 1:
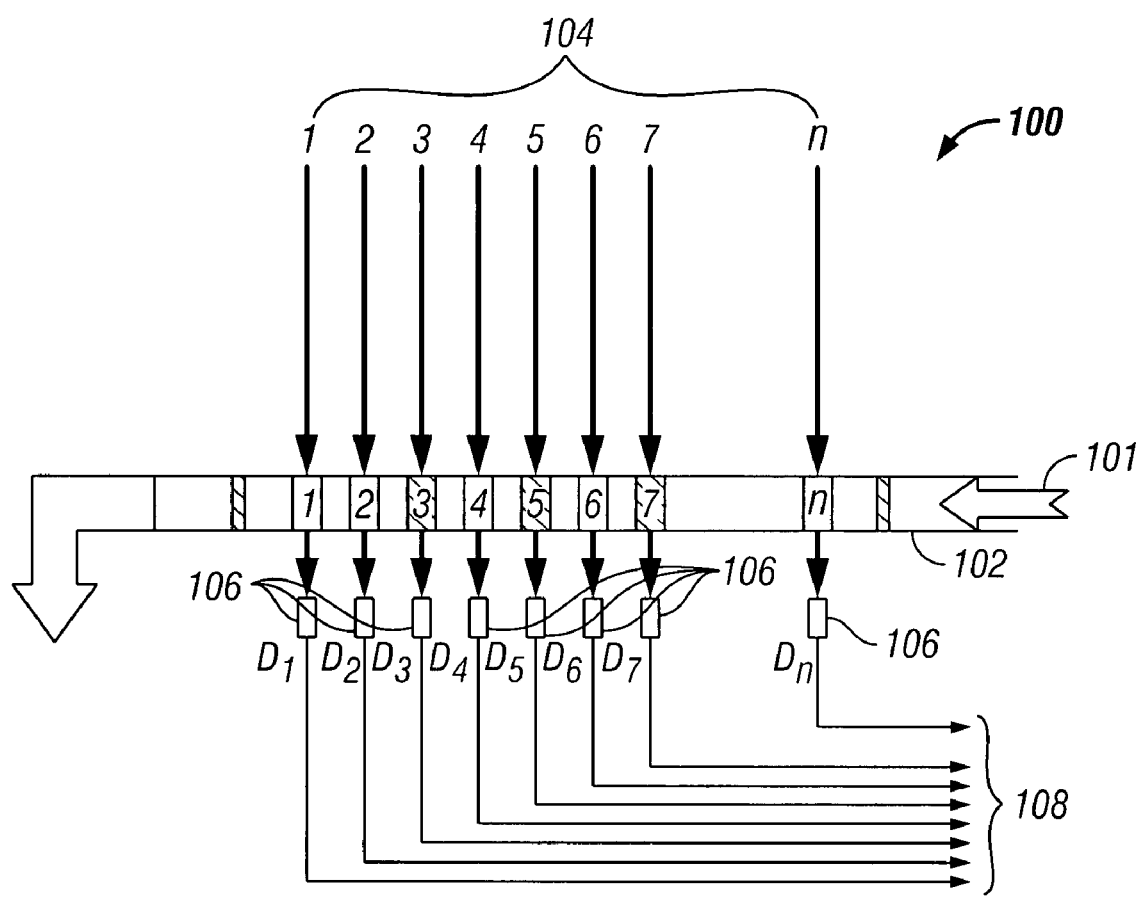
FIG. 1 is a schematic diagram of an optical fiber data reader system in accordance with one embodiment of the present invention, wherein interrogating pulses combine with data pulses in a specially doped optical fiber.

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Referring to the drawings, where like numerals of reference designate like elements throughout, it will be noted that the present invention provides. an optical fiber bit stream reader system for examining the data contents of an optical fiber, which involves the conversion of a temporal timing signal into a spatially located signal. The system generally comprises obtaining a signal indicating the presence of data, and detecting the signal, in a manner which is minimally destructive to the data contents.

The bit stream reader system can be used with most any typical fiber optic data transmission operation. A typical example of such operation is a 10 GB/s (Gigabits per second) optical communication system in which each optical data packet is ~1.26 μsec (or any other standard number) long and contains 128 bits (or other standard number) of header information.

According to one embodiment, the optical header is read using nonlinear optical phenomena, including a two-photon luminescence detection method and control with simultaneous interrogating pulses.

This method utilizes an optical fiber that exhibits a nonlinear response through a two photon absorption process and subsequent photon emission corresponding to the two photon absorption. Depending on the specific application, only a short segment of the optical fiber capable of exhibiting such non-linear response may be necessary. For example, for a 10 GB/s system, a data packet containing 128 bits can be read using a nonlinear optical fiber segment which is approximately 2.5 meters. This piece of optical fiber may be coupled to a single mode, single Dense Wavelength Division Multiplexing (DWDM) channel.

Such a fiber could comprise a conventional doped silica fiber into which an additional dopant or dopants have been introduced. Based on the schemes shown in FIGS. 2A-C, light pulses directed orthogonal to the fiber will generally cause the energy level of the dopant to rise to a first excited state. If data pulse photons are simultaneously present, temporally as well as spatially, the dopant ion is further excited to a second excited state. From the second state the dopant ion decays to ground state emitting photons at one or more wavelengths in the process. These wavelengths will be different from either the orthogonally directed interrogating pulses or the data pulses. The data pulse light is weakly absorbed if and only if the interrogating pulses are present at the same location and at the same time.

Thereafter, the emitted wavelength(s) or frequencies can be detected using the detectors as shown, and, hence, the light pulses traveling at near velocity of light in the fiber have been spatially "frozen" by the temporal probing pulse. It should be noted that there are other possible schemes for generating a response indicative of the presence of data based on energy absorption followed by excited state emission, depending on the type of dopant(s) and energy absorbed. Additionally, an optical signal bit will be weakly absorbed through a two-photon absorption process if an additional probe beam is present at high intensity. Such intensity may be in the order of 1 kW/cm$^2$ for a 10 GB/s system depending on the nonlinear material, for example.

Such reading scheme is minimally destructive. It is important to note that any readout scheme for deciphering the header will necessarily be destructive, but it needs to be as nondestructive as possible or be minimally destructive because the readout must not destroy, distort, or significantly attenuate the optical signals on the optical channel.

FIG. 1 illustrates an optical fiber data reader system 100 according to the implementation described above, wherein interrogating pulses combine with data pulses in a specially doped optical fiber 102. Light emission occurs when both pulses are present.

For the purpose of illustration, an exemplary snapshot of optical pulses propagating down the fiber is shown in the figure, with the pulses marked by spatial positions 1, 2, 3, . . . , n. At any instant, a dark region indicates the absence of an optical field corresponding to a pulse of light. (The arbitrarily selected dark regions in the figure are at positions 3, 5, and 7). This may be ascribed to a "0" state or a "1" state depending on the choice of negative-true or positive-true logic.

For the purposes of this illustration, this example represents a bit pattern of 1101010 . . . 1 in FIG. 1, using positive-true logic.

The bit-stream 101, encoded as pulses of light, is shown in the figure as entering from the right-hand side into the non-linear fiber 102 assembly and propagating to the left. The doped fiber 102 is also illuminated, preferably by interrogating pulses of light 104 at a frequency $v_P$.

These pulses are preferably of very short duration (in the order of 50 ps or shorter for a 10 GB/s system, for example) and impinge upon the nonlinear fiber at right angles to the propagation direction of light in the fiber as shown. The interrogating pulses are preferably strobed in synchronism with the signal pulses so that when the signal pulse at frequency $v_L$ is at the marked positions 1, 2, 3, . . . n, the interrogating pulses are also present at the same time and same place.

Examples of different energy level diagrams 200, 202, 204, and 206 for the dopant in the doped fiber are shown in FIGS. 2a through d. The energy level schemes shown in FIGS. 2a-c will generate an output photon only when data and interrogating photons are simultaneously present. It will be apparent to one skilled in the art that different energy schemes may be implemented, and that the particular scheme depends on the type of dopant(s) used and energy absorbed. Examples of some suitable dopants include Nd, Ho, and Tm, and will depend on the wavelength of the data light pulses and the interrogating light pulses.

Figure 2A:
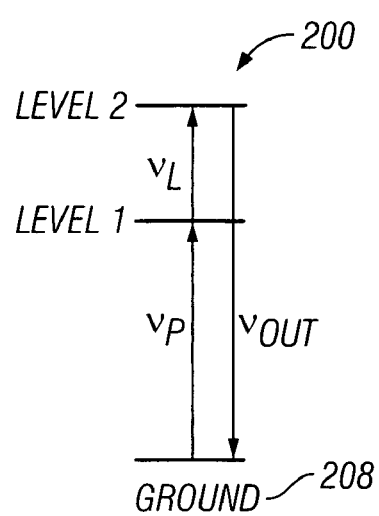
FIGS. 2A-D illustrate four different energy level schemes for generating an output photon in accordance with the system of FIG. 1.
Figure 2B:
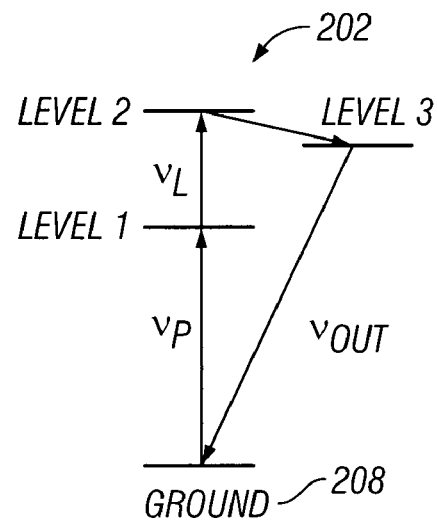
Figure 2C:
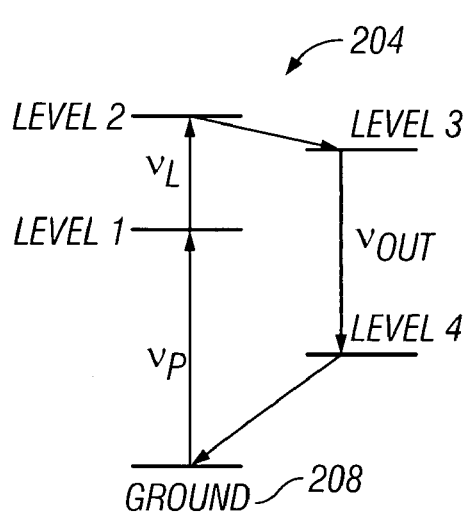

In each of the schemes, the interrogating pulses, at frequency "$v_P$" as indicated in the figures, are absorbed to raise the dopant from the "GROUND" level 208 to a first excited state ("Level 1") as shown in the figures. If data pulse photons are simultaneously present at frequency "$v_L$" then the dopant ion is further excited to a second excited state ("Level 2") as shown in FIGS. 2a-c. From the second state, the dopant ion decays to the ground state 208 as shown in FIG. 2A through the emission of a photon (indicated by "$v_{OUT}$") or relaxes very rapidly through nonradiative or other relaxative processes to a "Level 3" state, as shown in FIG. 2B. As indicated in FIG. 2B, Level 3 is radiatively connected to the ground state 208. The presence of the photon at a frequency "$v_{OUT}$" signifies that both the interrogating and signal photons are simultaneously present at the same physical location.

FIG. 2C shows a four-level detection scheme in which a fourth state is added to the case shown in FIG. 2B. The emitted light results from a transition between a third state ("Level 3") and a fourth state ("Level 4"). Fast relaxation couples the fourth state back to the ground state. This is characteristic of many laser systems, such as the Nd:YAG, in which laser action can take place at an energy determined by the spacing between the third and fourth states.

The photons emitted at a frequency VOUT may be detected as shown in FIG. 1, by an array 106 of fast optical detectors $D_1, D_2, D_3 \ldots D_n$ whose electrical outputs 108 may be fed into a pattern recognition circuit which is preferably also strobed simultaneously with the probe pulses to assure that only the signals at $v_{OUT}$ coming out at the correct time are compared.

Figure 2D:
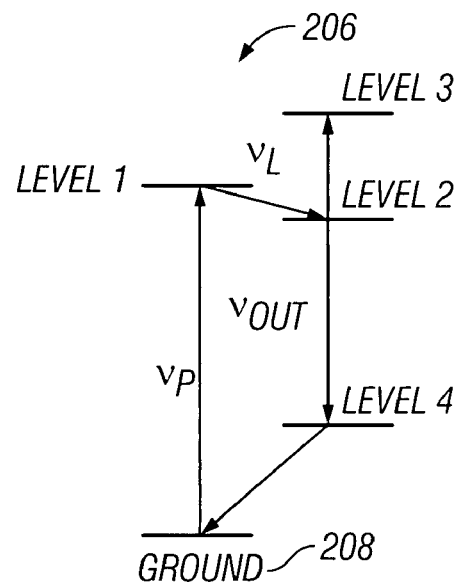

FIG. 2D shows a four level readout scheme modulated by excited state absorption, wherein the pulse of light in the fiber depletes population from a readout state into a so-called "excited-state absorption." This means that there will be less light emitted between the second and fourth states if a data pulse is present than if a pulse is absent.

It is also possible, with sufficient power in the interrogating pulse, to propagate that pulse in such a manner as to create one of the excitations necessary to read out the optical pulse train by using a single strobe pulse to illuminate the entire fiber. The multiple parallel pulses shown in FIG. 1 are replaced with one strong strobe pulse that covers the entire fiber region of interest and is of sufficient intensity and duration to excite all of the dopant molecules at once. Those dopant molecules in an optical bit will generate light as described in the previous section.

It should be noted that the multiphoton absorption process, being a weak process, guarantees that the bit stream coming down the signal fiber, going into the doped fiber, and again going out to the transmission fiber (and, if desired, to the optical switch described below) experiences only minimal distortion and minimal loss of say <0.1 dB (preferably less than 0.01 dB) for a 128 bit readout, based on a 10 GB/s system, for example.

According to an alternate method, a signal indicating the presence of data may be generated by modifying the index of refraction of the optical fiber. The index of refraction is preferably modified at the surface of the optical fiber using a spatially periodic, time dependant optical grating.

Pulses of light are guided in a communications fiber due to the difference in index of refraction of the core ($n_{core}$) and the cladding ($n_{clad}$). If $n_{core} > n_{clad}$, as is the normal case, light coupled into the fiber will suffer total internal reflection at the core/cladding boundary and be confined to propagating down the axis of the fiber. It is well known that there is an "evanescent wave" that propagates a finite distance from the core into the cladding. This wave decays exponentially with distance into the cladding but is nevertheless present wherever there is an optical electric field (i.e., a light pulse) within the fiber.

Figure 3:
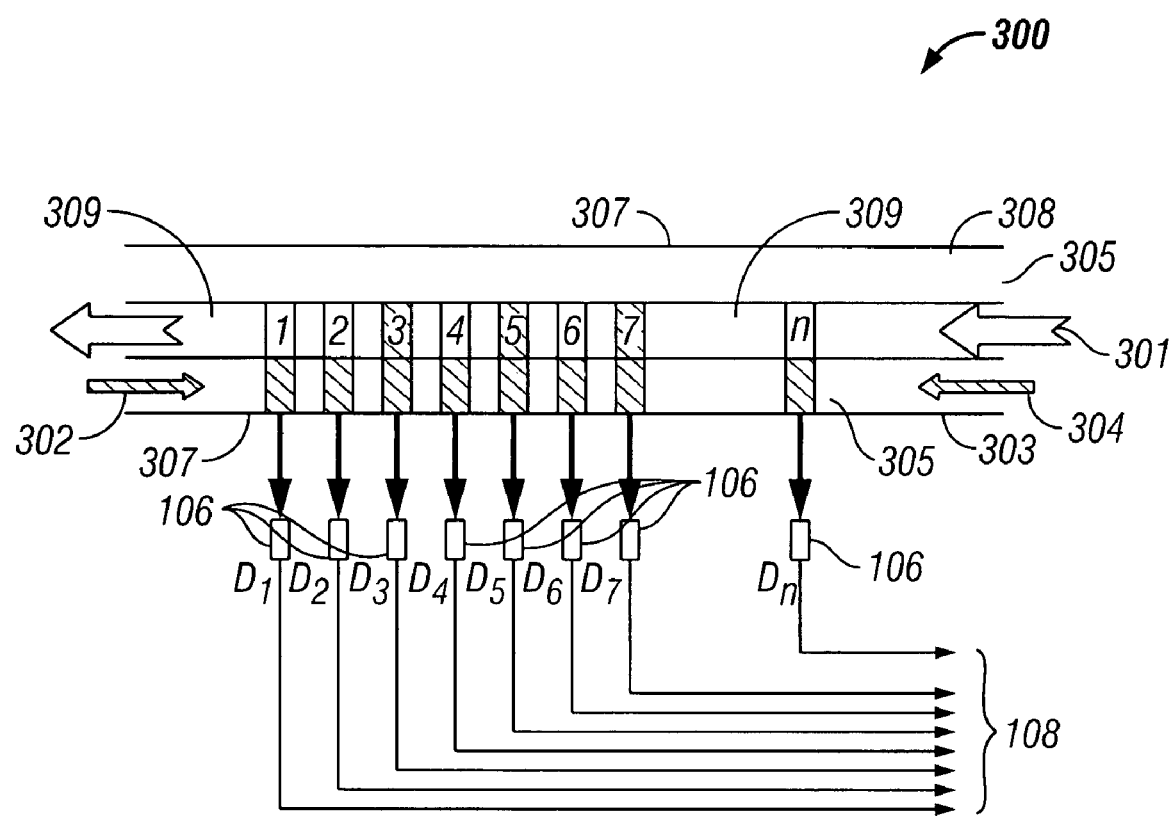
FIG. 3 is a schematic diagram of an optical fiber data reader system in accordance with another embodiment of the present invention, illustrating a process for generating an output pulse by modifying the index of refraction of the optical fiber cladding.

FIG. 3 illustrates a system 300 for sampling the pulses 301 within an optical fiber 303, based on modifying the index of refraction, rather than adding a dopant. This method involves changing the refractive index of the fiber cladding 305.

According to a preferred method, the cladding is coated on its surface 307 or otherwise modified with a material that absorbs light at a specific wavelength which need not necessarily be at the wavelength of light used for optical data transmission. Interrogating pulses are then implemented by two counter-propagating pulses, 302, 304, which set up an instantaneous, temporary interference pattern in space at the expected positions of the optical bits in the fiber (for the purposes of illustration, positions 1, 2, 3, . . . , n are indicated in the figure).

The interrogating pulse beams 302, 304 also serve to define an instant in time over which the data packet is probed. These beams are at the absorption wavelength of the surface absorber and, hence, excite the absorber into another state, thus modifying the index of refraction of the cladding at the specified locations.

The index of refraction of the cladding, $n_{clad}$, can be made to exceed the core 309 index of refraction, $n_{core}$, by a suitable choice of the absorbing material. Such an absorbing material could include transition elements from the periodic table. If there is an electric field (i.e., light pulse) associated with the data contents transmitted through the optical fiber, at a location where $n_{clad}$ has been thus modified, some fraction of that field will not be guided and will be coupled out of the fiber. The subsequent detection and processing scheme are unchanged from the first embodiment.

It is possible, with sufficient power in the interrogating pulse, to propagate that pulse in such a manner as to create one of the excitations necessary to read out the optical pulse train by using a single strobe pulse to illuminate the entire fiber at right angles to the direction of propagation. The multiple pulses 302, 304 shown in FIG. 3 are replaced with one strong "bleaching" pulse of sufficient intensity and duration to excite all of the dopant molecules at once. Those dopant molecules close to an optical bit will generate light as described in the previous section. A pulse directed at a right angle can also be used to modify the core instead of the cladding, in order to have $n_{clad}$ exceed $n_{core}$.

This bit stream reader systems of the present invention may be implemented in a fiber having either a cylindrical or planar geometry. A planar geometry permits the close location of the detectors to the interrogating volume. This makes very effective use of the photons detected through the fiber, lowering the detection threshold and thereby the amount of loss to the packet as it propagates through the optical train.

Figure 4:
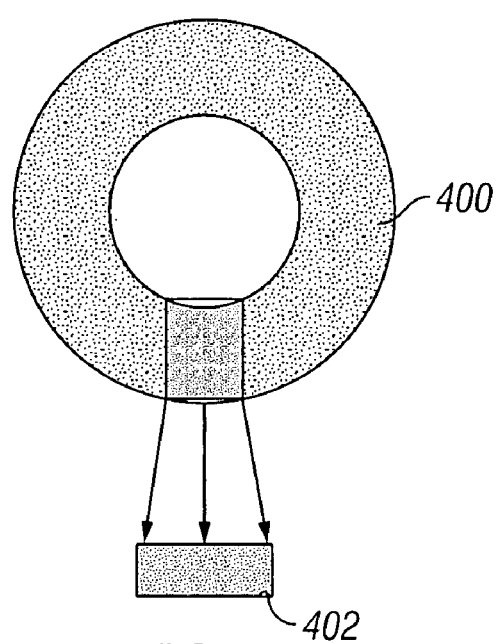
FIG. 4 is a sectional view of a partially modified fiber for coupling light in the direction of a detector.

In the case where the geometry is cylindrical, the fiber 400 may only need to be modified in specific regions as shown in FIG. 4, when bit stream reader system is achieved by changing the index of refraction. Here, light will only be emitted within the acceptance angle of the detector assembly 402, hence minimizing the loss experienced by the optical pulse train as it continues to propagate down the fiber 400.

Various applications of the bit stream reader system of the present invention, some of which are described below, will be apparent to one skilled in the art.

EXAMPLE 1

An All Optical Router and Switcher

The bit stream reader system, according to any of the described methods, may be used in implementing an all-optical router system. The functions that may be accomplished by the router system include:
1. Reading an optical header on a data packet;
2. Identifying the intended destination of the date packet;
3. Switching the optical data packet to the identified destination in optical domain;
4. Providing a mechanism for identifying an empty time slot in optical domain; and/or
5. Restuffing the empty optical data slot with information coming for a user.

These functions may be accomplished in an elegant fashion without destructively converting photons into electrical pulses. As described above, a "snapshot" of the optical pulse train within the fiber is generated using a bit stream reader system, according to any of the described methods. The system 100 of FIG. 1, using a doped fiber and interrogating pulses directed orthogonal to the fiber, is used for the purposes of illustrating the router and switcher system of this example. It should be understood, however, that any of the other described methods for a bit stream reader systems may also be used in devising a similar router and switcher system. For this application, the reader system of. FIG. 1 is defined as a "Header Reader."

Figure 5:
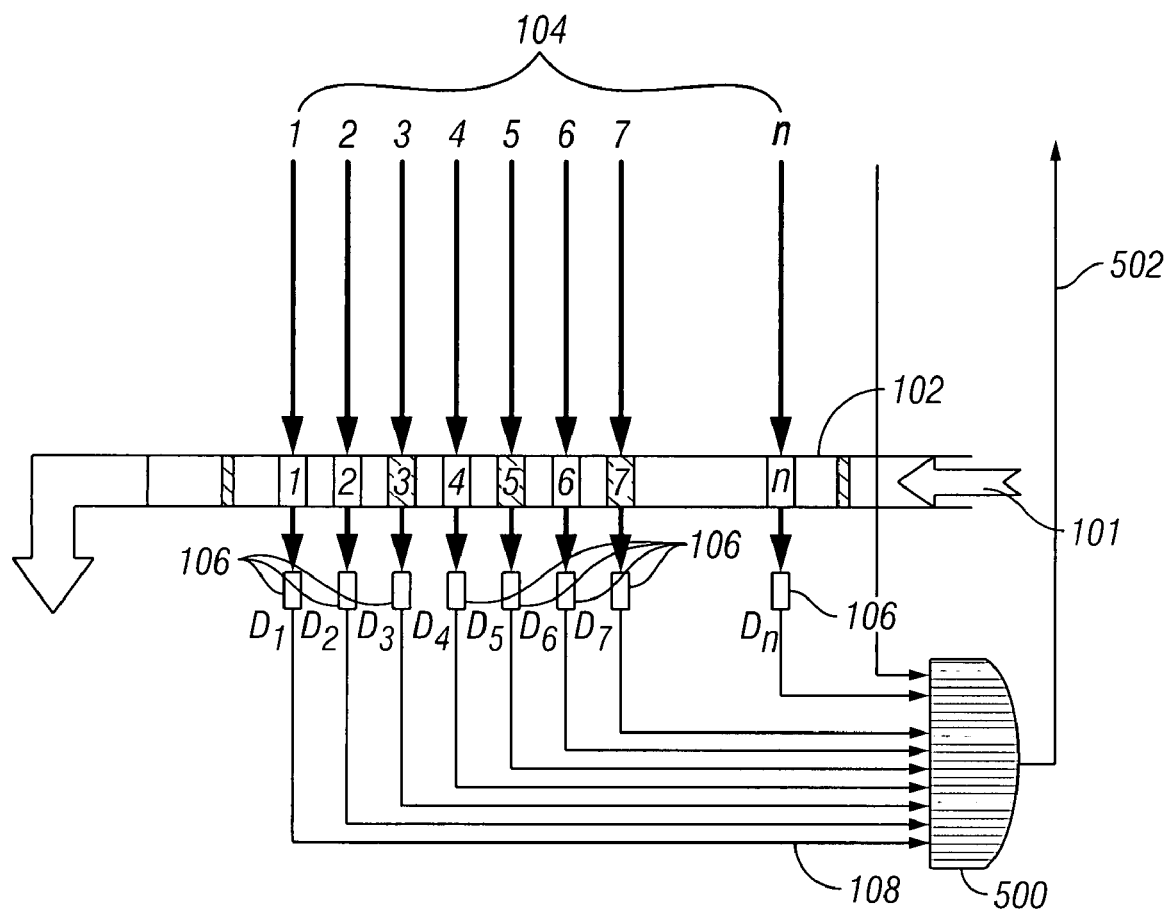
FIG. 5 is a schematic diagram for a method of identification of an optical data packet.

FIG. 5 shows a scheme for the identification of an optical data packet matching a specific pattern. In FIG. 5, the detectors $D_1, D_2, D_3 \ldots D_n$ will output electrical pulses corresponding to the optical bit pattern whenever the interrogating pulses are present. These pulses are routed to a Comparator 500 which checks the instantaneous data pattern against a target. If the two match, the Comparator 500 indicates so, for example by putting out a "1" pulse on its output line 502, which will be used subsequently to "kick out" the optical data packet to its intended destination. It is important to note that the optical data stream has not been degraded or destroyed in this readout and still exists in optical form for further action.

Figure 6:
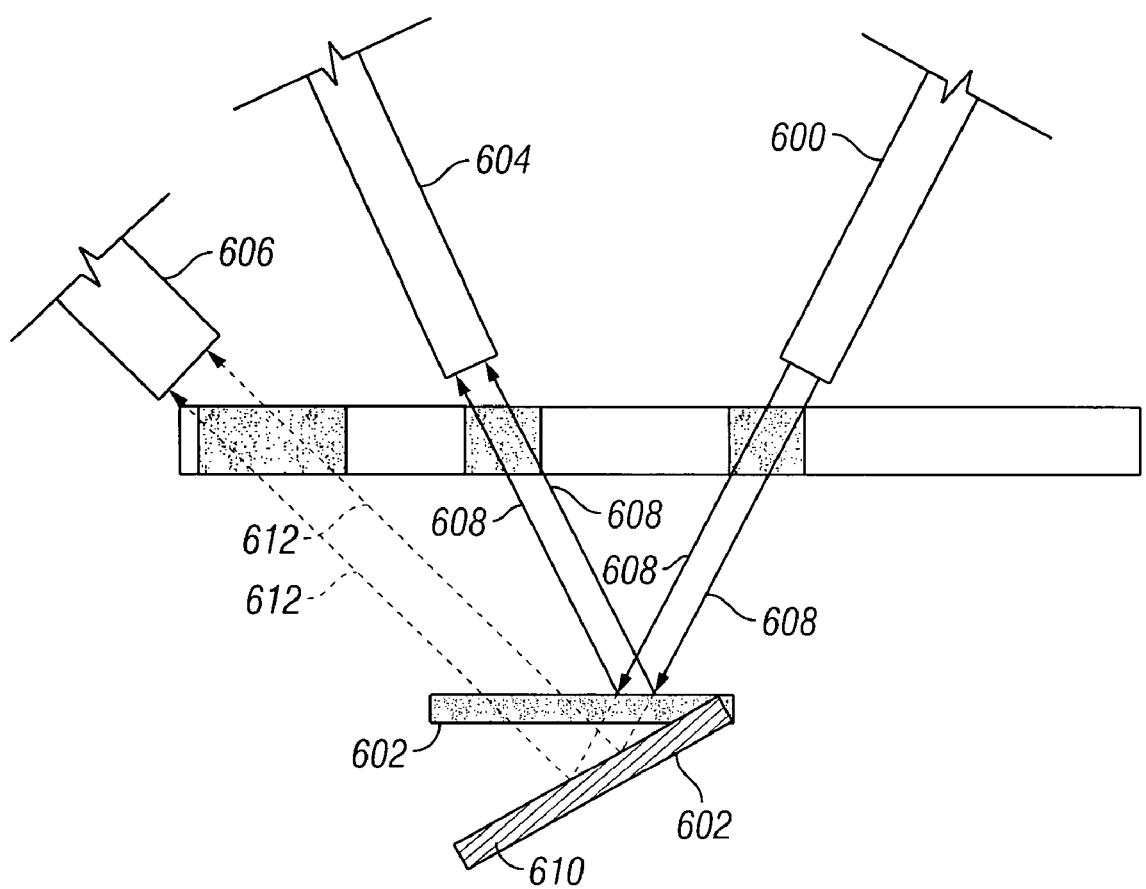
FIG. 6 is a schematic diagram for an optical switching method for sending an identified packet to a specific destination.

FIG. 6 shows an optical switching system for sending an identified packet to a designated destination (termed "Destination 1"). The implementation of the optical switch consists of the input fiber 600 (termed "Signal In fiber") coming from the Header Reader in FIG. 5, a MEMs (Micro Electro Mechanical) switchable mirror 602, a signal output fiber 604, and an optical fiber 606 to Destination 1. If the output from the Header Reader Comparator indicates that no match has been found, by outputting a "0" for example, then the MEMs mirror control circuit for the MEMs mirror 602 receives no switching signal, and the bit stream from the Signal In the fiber (from the Header Reader of the input fiber 600) is reflected into the signal output fiber 604 (termed "Signal Out fiber"), as shown by the solid lines 608.

If the Header Reader and the Comparator have identified the header as a match, thus indicating in this example that the data packet associated with the header is intended to go to Destination 1, then the Comparator will put out a "1" signal level which is used to flip the MEMs mirror to position 610, shown by the cross-hatched mirror in the figure. The mirror remains in the flipped position 610 for the length of the packet (approximately 1.26 ☐sec for reading 128 bits of a header and the message contained in the following bits in the packet) in 10 GB/s system).

During the switched position time, the optical packet, including the header, coming in along the "signal in" fiber 600 (from the Header Reader Output (1)) is directed to the Destination 1 fiber 606 as shown by the dashed optical path 612. At the end of the packet time, the MEMS mirror 602 flips back to its original position, and the optical signal from the "signal in" fiber 600 continues in the Signal Out fiber 604. It is important to note that one packet out of all the packets coming down the "Signal In" fiber is completely switched without loss. Additionally, the time slot occupied by the packet that was switched out to Destination 1 is emptied in this process.

It should be understood that each of the fibers is appropriately provided with transition optical elements such as lenses, GRIN lens or other transition, etc. to convert fiber transmission mode into free space transmission mode and back as needed with minimal signal loss. It should further be understood that sufficient optical delay is provided between the optical output from the Header Reader in FIG. 5 and the "Signal In" into the Optical Switch in FIG. 6 so that the electronic delay in the Comparator etc. is appropriately matched and the MEMs mirror switches exactly at the beginning of the identified packet (including its header).

Once the "Signal Out" comes out of the Optical Switch for which the time slot corresponding to the removed packet is empty, a header may be put in this slot to indicate that slot is empty, or the slot can be stuffed with an optical packet from the Destination 1 user.

Figure 7:
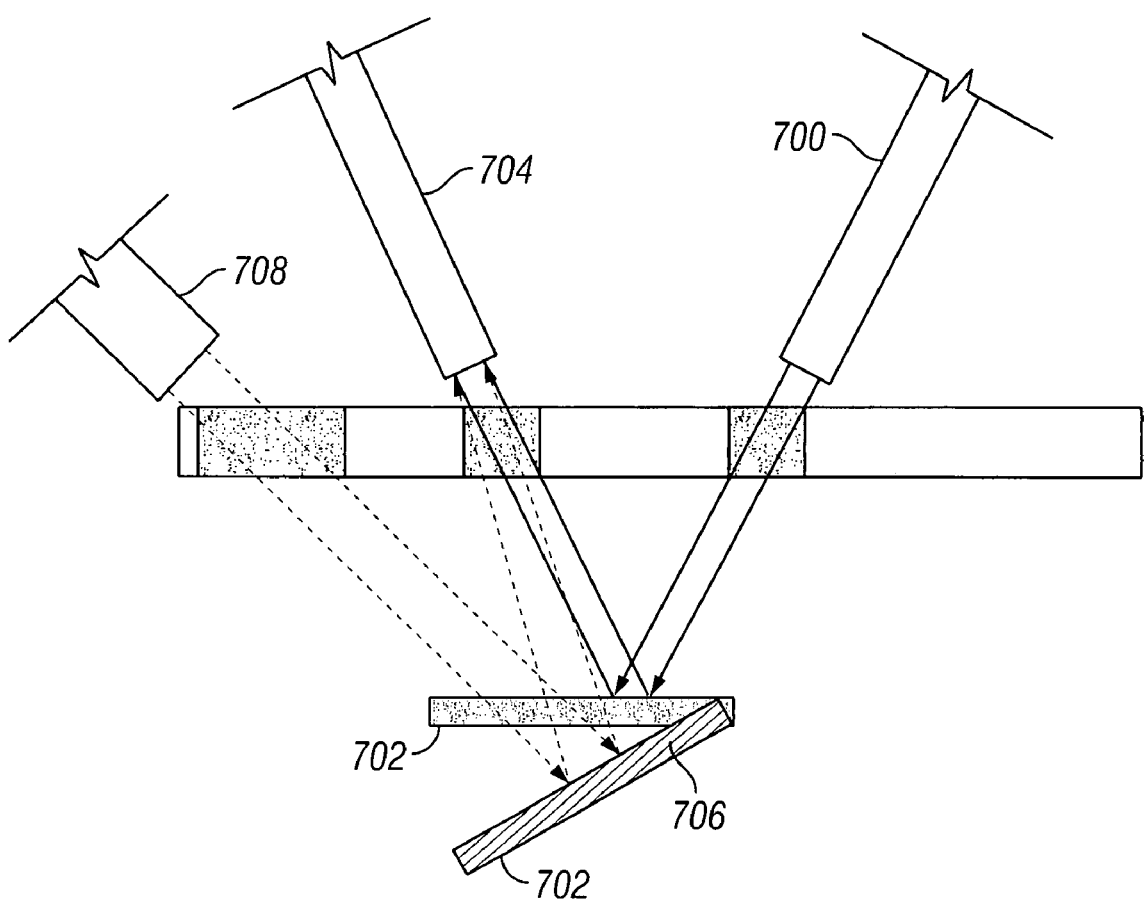
FIG. 7 is a schematic diagram of an optical switching method for inserting an empty slot header into an empty time slot and/or for stuffing a packet with an appropriate header in an empty time slot.

FIG. 7 shows an optical switch scheme for putting an "empty slot" header in the empty time slot and/or stuffing a packet in an empty time slot. Again, the "1" signal obtained from the Header Reader in FIG. 5 may be used to time the switching. In this case, and in following the established convention, the Comparator circuit is programmed to also put a "1" out on the Control Line whenever the optical header pattern corresponds to the empty packet identifier pattern, if such an empty slot is coming in on the Input Fiber. The "Signal Out" 700 (formerly 604 in FIG. 6) is coupled into a second optical switch as shown in FIG. 7.

If the Header Reader signal on the Control Line is a "0," the MEMs mirror 702 in FIG. 7 is not switched and the input signal from "Signal Out" 700 is reflected into the Output Fiber 704 to be transmitted to the next location(s). A Header Reader signal on the Control Line of "1," may indicate that a packet has been removed to be sent to the Destination 1 and that the time slot is empty or that the Input Fiber had an empty slot header on it. This Control Line "1" signal may then be used to inform the Destination 1 user that this packet slot position is empty, and that it should be ready to stuff a data packet back into this empty slot if it has a packet ready to be sent out, or put back an empty header slot identifier.

The Control Line "1" signal may then also be used to flip the MEMs mirror 702 to the flipped position 706, in which it reflects the signal coming in from the Destination 1 user 708 into the Output Fiber 704.

Thus, the packet of information coming from fiber 708 that now occupies the space which was created by removing the packet in FIG. 6 is either a data packet with its associated header or an empty packet indicator header, which has no data following the header. Again, the MEMs mirror in FIG. 6 stays in the switched position for the predetermined duration of time corresponding to the packet length, as discussed above.

It should be noted that a Control Line signal of "1," corresponding to an empty slot header, will have removed the empty slot header when the optical signal went through the Optical Switch in FIG. 6. This empty slot indicator signal received by the Destination 1 user will have told the user to put back the empty slot header or stuff an appropriate data packet back in as the case may be.

In case there is no packet of data coming in from Destination 1 user, the Optical Switch in FIG. 6 will have launched an empty slot header onto the outgoing fiber so that all the subsequent Header Readers will "know" that this slot is empty and that it can be used for stuffing packets back in without collisions.

If, on the other hand, the Destination 1 user had a data packet waiting to be stuffed on to the fiber, the "1" signal, would switch the MEMs mirror in Optical Switch in FIG. 7 appropriately. Such "1" signal would correspond to the data packet intended for Destination 1 user and "kicked out" by Optical Switch in FIG. 6 and therefore indicate an empty packet slot, or correspond to an empty slot header which too would have been kicked out by the Optical Switch in FIG. 6 and informed the Destination 1 user that the time slot was available.

This scheme of restuffing the information from the Destination 1 user and its fiber input to the output fiber works when the Header Reader has identified an empty slot header coming from the input fiber. The Comparator is designed to output a "1" signal when the header is appropriate for switching the following packet to the Destination 1 user or when the header indicates an empty slot. Thus, a complete all-optical packet switching router that avoids collisions is achieved.

It should be noted that although the Optical Switch is described as using a MEMs fabric, this is neither a requirement nor a limitation. Any type of switchable directing element capable of directing the data can be used. Such directing element may include a variety of other fast optical switches such as an electro-optic switch, a switchable add/drop multiplexer etc. A mirror which is switchable between a reflective and transmissive mode can also be used.

Additionally, a router system in accordance with the present invention may include more than one destinations through which optical data may be rerouted. Such system may be achieved by using a mirror which is switchable to three or more different positions, or a mirror which is switchable between reflective and transmissive modes, in addition to being switchable to different positions.

EXAMPLE 2

Generalized Optical Fiber Probe

An issue which has not yet been explicitly addressed is how it is known where the signal optical pulses are located in time (and therefore in space) for them to be interrogated by the locally generated pulses in FIG. 1. One way of doing this would be to have the interrogating pulse repetition rate to be, say, ten times faster than the optical data rate on the fiber. The incoming pulse stream can then be easily time located. Once the incoming pulse stream is correctly timed, the interrogating pulse repetition rate can go back to the rate at which the optical signal pulses arrive.

This method can be used with the reader system of any of the described embodiments. The fast strobing and low loss of the reader allow a data stream to be monitored continuously. "Signature analysis." in the optical domain is also enabled. A test pattern can be inserted at one node of a network and monitored nondestructively at any other node or transmission path where the reader is installed. Thus, the system health may be monitored in this manner.

EXAMPLE 3

Generalized Probe of System Health

The average power in a given length of communication fiber will be a constant with some small deviation. This is true given that, on average, there will be optical 1s and 0s in some fixed ratio. By constantly illuminating the fiber reader with a low intensity interrogating beam, some average output power at the readout wavelength should be seen at the expense of being able to resolve data packets. This is, nonetheless, valuable as a diagnostic. If the output power changes drastically, it is an indication that something is wrong with the link; either a break in the line, insertion of a tap, or some other signal-degrading phenomenon. A fault can then be indicated at the network control point.

Additionally, certain dopants may cause photo-emission in a fiber optic, generated by the presence of data pulses alone, without an additional interrogating pulse. FIG. 4d is an example on an energy scheme for a fiber optic displaying this characteristic. Such fiber optic can be used for monitoring the health of a system by continually measuring an average power output, without having to use additional interrogating pulses.

EXAMPLE 4

Real-Time, Random-Length Data Sampler

In Example 2 it was described how to synchronize the readout with the data rate using a period of very fast strobing. Once the synchronization condition is found, data packets of arbitrary length may be non-destructively read out by properly strobing the interrogating pulse. A short length of readout fiber will suffice, further minimizing insertion and readout loss. Further applications include using this method to tap into an optical line without disclosing the existence of a tap.

Many advantages and useful feature are provided by the present invention. Among such advantages and uses, the present invention provides an optical fiber bit stream reader system for almost nondestructive examination of the data contents of an optical fiber. Other advantages, features, and uses include: providing a straightforward method by which to probe the confined optical pulses propagating along an optical fiber; providing a method for examining an optical data stream for fault testing, housekeeping, and/or sampling; providing a method for imposing a test pattern at one point along an optical fiber and examining the resulting data stream at other points; and providing a method for tapping into an optical line without having to disclose the existence of a tap.

These and other objects, goals, and advantages of the present invention will be apparent from a review of the following specification and accompanying drawings.

The detailed description set forth herein in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

While the present invention has been described with regards to particular embodiments, it is recognized that additional variations of the present invention may be devised without departing from the inventive concept.

What is claimed is:

1. A method for examining the data contents of an optical fiber comprising:
    generating a signal based on the presence or absence of data at a specific location in the optical fiber, in a manner that is minimally destructive to said data; and
    detecting said signal indicating the presence or absence of said data;
    wherein said signal based on the presence or absence of said data comprises a light having an intensity which is dependant on the presence or absence of said data; and
    wherein said intensity generated when said data is present is lower than said intensity generated in the absence of said data.

2. A method for examining the data contents of an optical fiber comprising:
    generating a signal based on the presence or absence of data at a specific location in the optical fiber, in a manner that is minimally destructive to said data;
    detecting said signal indicating the presence or absence of said data; and
    modifying the index of refraction of at least a portion of the optical fiber, wherein said data, if present, causes a signal to be emitted through at least a portion of the fiber where said index of refraction has been modified;
    wherein said index of refraction is modified by sending a frequency pulse through the optical fiber; and
    wherein said frequency pulse comprises two counter-propagating pulses which set up an interference pattern causing the index of refraction to be modified at specific locations of the optical fiber.

3. A method for examining the data contents of an optical fiber comprising:
    generating a signal based on the presence or absence of data at a specific location in the optical fiber, in a manner that is minimally destructive to said data;
    detecting said signal indicating the presence or absence of said data; and
    modifying the index of refraction of at least a portion of the optical fiber, wherein said data, if present, causes a signal to be emitted through at least a portion of the fiber where said index of refraction has been modified;
    the optical fiber having a cladding and a core, each having a separate index of refraction, wherein the index of refraction of either the cladding, core, or both is modified to cause the index of refraction of said cladding to exceed the index of refraction of said core.

4. A method for examining the data contents of an optical fiber comprising:
    generating a signal based on the presence or absence of data at a specific location in the optical fiber, in a manner that is minimally destructive to said data;
    detecting said signal indicating the presence or absence of said data; and
    modifying the index of refraction of at least a portion of the optical fiber, wherein said data, if present, causes a signal to be emitted through at least a portion of the fiber where said index of refraction has been modified;
    wherein said index of refraction is modified at the surface of the optical fiber; and
    wherein said index of refraction is modified using a spatially periodic, time dependant optical grating.

5. An all optical router and switcher method comprising:
    examining data contents of an optical fiber by generating data signals based on the presence or absence of data at a specific location in the optical fiber, in a manner that is minimally destructive to said data; and
    detecting said signals using at least one detector element, said signals forming at least one data packet, said detector element generating an output based on said data packet;
    checking said output against a target; and
    generating an indication signal that indicates whether or not said output matches said target.

6. The method of claim 5 wherein said target comprises a data packet of a specified data pattern, or an empty packet.

7. The method of claim 5, further comprising rerouting said output from said optical fiber to a first destination if said output matches said target.

8. The method of claim 7, wherein said output is routed to said first destination using a switchable director element that can be switched to rout said output to said first destination, and that directs said output to a continuation optical fiber line when unswitched.

9. The method of claim 8 wherein said director element is a switchable mirror, which is switched to rout said output to said first destination.

10. The method of claim 8, said continuation optical fiber line comprising an empty time slot as a result of said outputs being routed, further comprising replacing said empty time slot with a desired data packet.

11. The method of claim 10, said desired data packet comprising the data packet corresponding to said output that was routed to said first destination, or a data packet indicating that said time slot is empty.

12. A method for determining the pulse rate of data transmitted through an optical fiber line, comprising:
    providing a fiber optic line capable of generating a signal response which indicates either the presence or absence of an optical pulse of said data at a determined location in the optical fiber line, said signal response capable of being generated when an energy pulse is directed at said fiber optic line; and
    directing said energy pulse at said fiber optic line, said energy pulse having a pulse rate that is higher then an estimated optical pulse rate of said data.

13. An optical bit stream reader for reading fiber optic bit stream data comprising:

a fiber optic line through which said data is transmitted, said fiber optic line comprising a core and a cladding, each having an index of refraction;

at least one discrete point in said fiber optic line, where the index of refraction of said cladding exceeds the index of refraction of said core, wherein at all other locations in the fiber optic, said index of refraction of said core exceeds said index of refraction of said cladding, such that a small fraction of data, if present in the fiber optic at said discrete point, is coupled out of the fiber optic and can be detected; and a detector element for detecting said data.

14. The method of claim 13 further comprising at least one energy source that can modify said index of refraction at said point.

* * * * *